United States Patent [19]

Heil

[11] Patent Number: 5,052,658

[45] Date of Patent: Oct. 1, 1991

[54] VALVE SEAL APPARATUS

[76] Inventor: John S. Heil, P.O. Box 1361, Pascagoula, Miss. 39567

[21] Appl. No.: 552,250

[22] Filed: Jul. 16, 1990

[51] Int. Cl.$^5$ ............................................. F16K 41/00
[52] U.S. Cl. .................................. 251/214; 277/112; 277/142; 277/152
[58] Field of Search ................ 251/214; 277/112, 138, 277/139, 141, 142, 152, 153, 207 R, 208

[56] References Cited

U.S. PATENT DOCUMENTS

| 941,934 | 11/1909 | Marsh | 251/214 |
|---|---|---|---|
| 945,433 | 1/1910 | Allen | 251/214 |
| 2,765,185 | 10/1956 | Mott | 251/214 |
| 3,393,916 | 7/1968 | Askew | 277/112 |
| 3,537,682 | 11/1970 | Prise | 251/214 |
| 3,582,041 | 6/1971 | Priese | 251/214 |
| 3,586,289 | 6/1971 | Priese | 251/214 |
| 4,061,157 | 12/1977 | Hanssen | 251/214 |

FOREIGN PATENT DOCUMENTS

| 383932 | 8/1973 | U.S.S.R. | 251/214 |
|---|---|---|---|
| 14025 | 6/1911 | United Kingdom | 251/214 |
| 486426 | 9/1952 | United Kingdom | 251/214 |

Primary Examiner—George L. Walton
Attorney, Agent, or Firm—Pravel, Gambrell, Hewitt, Kimball & Krieger

[57] ABSTRACT

A valve sealing apparatus including a valving member, a valve bonnet having continuous bore that communicates with the valving member, a valve shaft housed within the bore of the bonnet, a primary sealing member positioned in the bore of the valve bonnet which surrounds the valve shaft, and an annular ring positioned between the wall of the valve shaft and the wall of the bonnet for pressing into the face of the primary sealing member, for imparting a downward force on the primary sealing member, in order to prevent horizontal fluid flow between the valve body and the wall of the valve shaft on both the upper and lower faces of the primary sealing member, spring associated with the valve bore for maintaining force on the primary sealing member in order to maintain the primary seal.

13 Claims, 4 Drawing Sheets

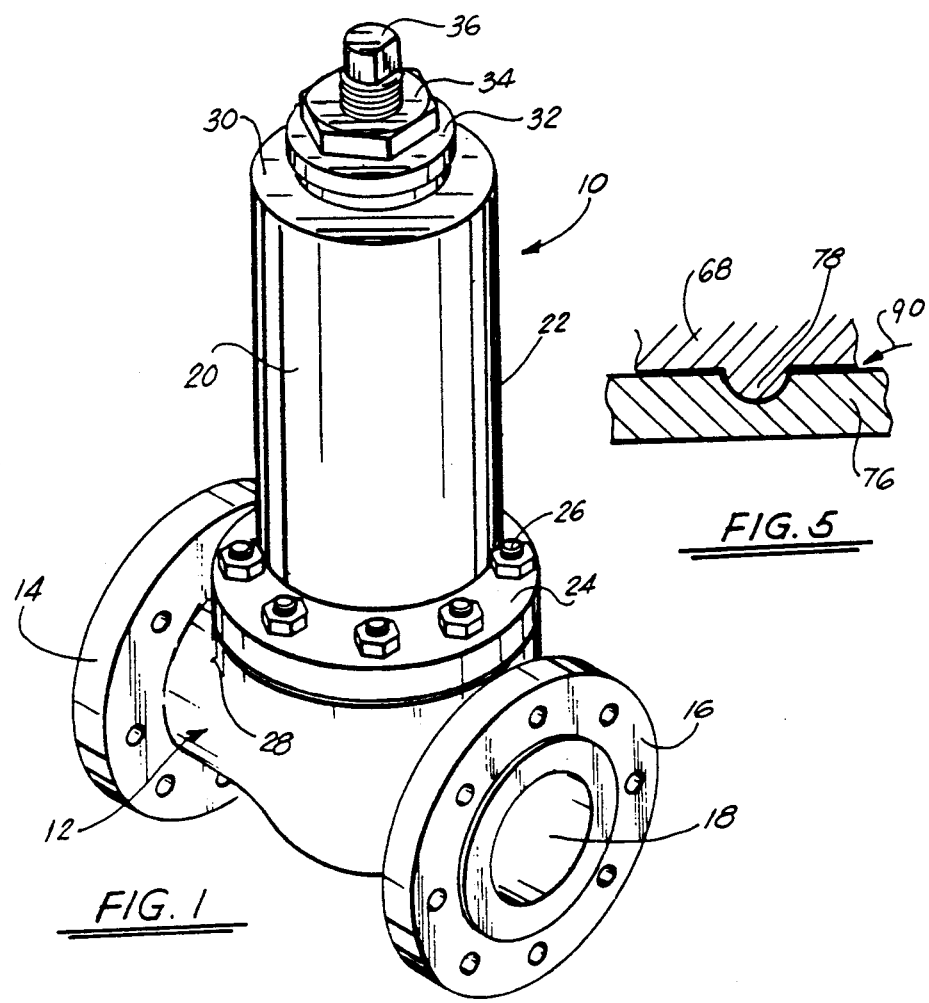
FIG. 1
FIG. 5
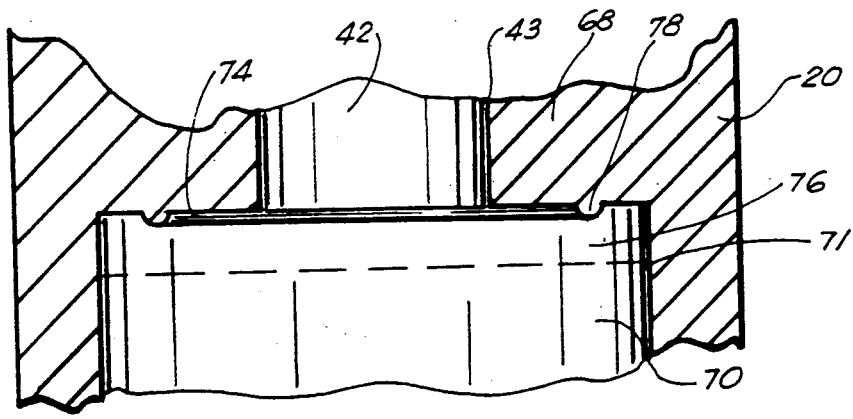
FIG. 4

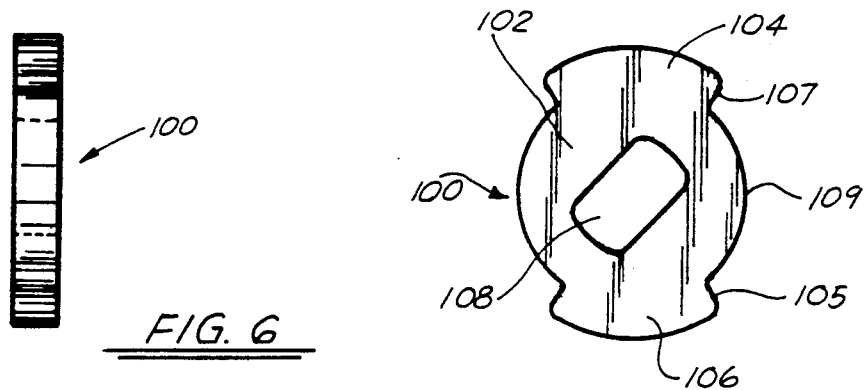
FIG. 6
FIG. 7
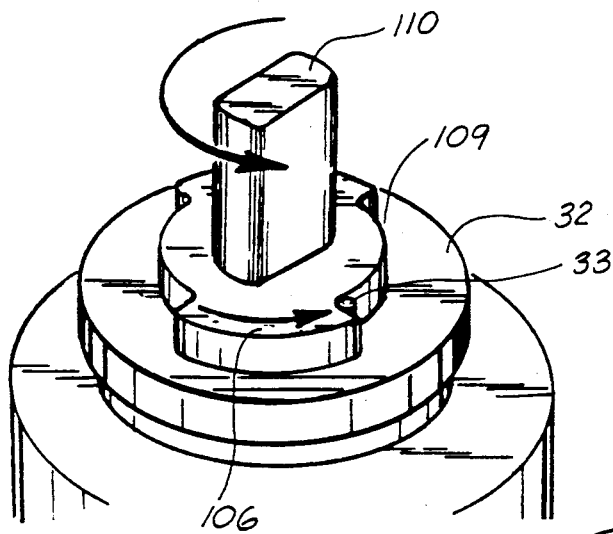
FIG. 8
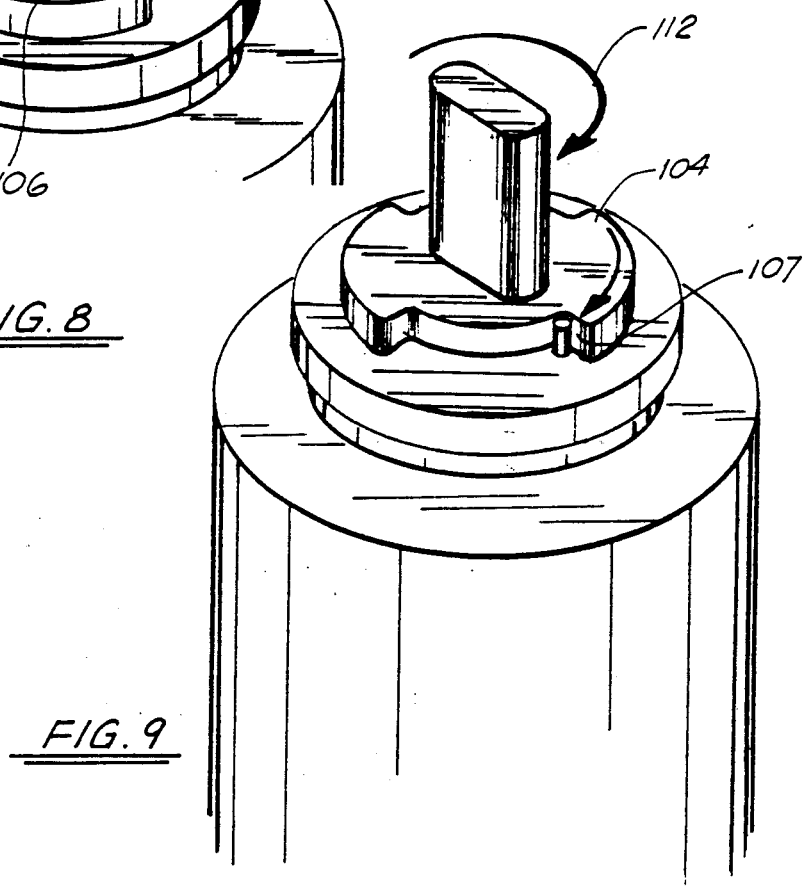
FIG. 9

VALVE SEAL APPARATUS

BACKGROUND OF THE INVENTION

1. Field of the Invention

The apparatus of the present invention relates to valves. More particularly, the present invention relates to a horizontal seal positioned in a valve body so as to reduce or eliminate emissions from various ball, plug, or butterfly valves, which normally rotate 90° between full open or fully closed to allow or stop the flow of the fluid in the line.

2. General Background

Due to the hazards that are being addressed in today environment, especially in the area of plant or inadvertent gaseous emissions from plants or the like, there is increasing awareness which is devoted to assuring that greater caution is undertaken in the construction of plants and the lines in plants which carry hazardous material, in order to prevent pollution problems which plague the chemical industry. One particular type of hazard is through inadvertent atmospheric emissions, which the chemical industry is attempting to reduce pollutants from the air at the source of the emission i.e., the chemical plant itself. It has been found that most fugitive emissions from chemical plants generally originate from leaks in the lines, such as leaking flanges, pump seals, or packing that are in valves. In the area of leaks in pump seals, these are corrected through more efficient seal designs.

In general, leaks in flanges are controlled by utilizing additional welded pipe rather than having to join segments of pipe in flanged joints. In the case of vapor leaks, that may escape through valves, this type of leak may be the most difficult to control, in view of the fact that in most cases, the leak has occurred in the packing gland of the valve prior to the need for adjustment being noted. For purposes of explanation, the packing gland is usually a material that is contained within the valve body, and would usually surround the valve stem and would be compressed between the body of the valve and the stem and would serve as a seal for fluids that may seep around the valve stem, and theoretically would prevent the leak from proceeding past the packing material. However, in view of the fact that the packing material often times is inadequate, and only forms a vertical seal, and may not be effecting a complete fluid tight seal, the fluid or gas is able to leak past the packing material around the stem space and out of the valve into the atmosphere.

It would therefore be a desirable feature in what are termed "90° valves" such as ball, plug or butterfly valves, to incorporate a simple, inexpensive valve seal that would seal horizontally in order to reduce or totally eliminate fugitive emissions. Such a seal in combination with a 90° valve is disclosed in the present invention.

The present inventor is the named inventor in U.S. Pat. No. 4,671,314, entitled "Flow Line Sampler Valve Apparatus", which discloses a stationary sealing wafer which served as a seal against the flow of fluids out of the valve other than through the valve flow line. The wafer was constructed preferably of Teflon material for carrying out the sealing function.

SUMMARY OF THE PRESENT INVENTION

The present invention provides a solution to the problems in sealing 90° valves in a simple and straight forward manner. What is provided is a 90° valve boltingly attached to a fluid line, of the type having a substantially cylindrical valve body, the valve body including a continuous bore therethrough, and housing a valve shaft extending through the valve body, so the valve shaft extends from the upper end of the valve body, and a handle is positioned thereupon. In most cases, the valve body would further include a spring within an enlarged bore of the valve body, a packing material in the upper portion of the valve shaft, and a compression nut forming a seal against the packing material for attempting to serve as a means for eliminating leakage around the valve stem. The preferred embodiment of the present invention would further include a wafer positioned along the valve stem, the wafer comprised of PTFE material (Teflon), and interposed between a shoulder portion of the valve body, and an enlargement of the valve stem. There would be further included a ridge built into the lower surface of the valve body shoulder, for compressing into the face of the wafer. This compression by the ridge into the upper face of the wafer transmits into a force directed through the wafer to effect a seal between the polished upper surface of an enlargement of the valve stem and the lower surface of the wafer to prevent any fluid from traveling past that point, and effect a seal on either face of the wafer. In a second embodiment, the spring would be positioned in the bore of the valve below the valve stem enlargement, so that the spring would be "in the process" as opposed to being on the outside of the process as stated earlier.

Therefore, it is the principal object of the present invention to provide a 90° ball, plug, or butterfly valve, including a sealing wafer interposed in the valve bore, for effecting a horizontal mechanical seal between the process and the valve bore, in order to prevent accidental fluid flow up around the valve stem;

It is a second object of the present invention to provide a primary mechanical seal between the process and the conventional packing gland of a 90° valve, with the packing gland serving as a secondary seal against fluid flow along the valve shaft;

It is an additional object of the present invention to provide a valve seal that can seal up to 20,000 pounds-per-square-inch (psi), and prevent any inadvertent leakage of gas or liquid along the valve shaft to the atmosphere; and It is still a further object of the present invention to provide a horizontal seal in addition to the packing gland in a 90° valve, which would place the mechanical seal as the primary seal between the process and the conventional packing gland.

BRIEF DESCRIPTION OF THE DRAWINGS

For a further understanding of the nature and objects of the present invention, reference should be had to the following detailed description taken in conjunction with the accompanying drawings, in which like parts are given like reference numerals, and wherein:

FIG. 1 illustrates an overall perspective view of a typical 90° valve which would utilize the present invention;

FIG. 4 illustrates a partial cut-away view of the enlarged bore that would house the valve seal in the present invention;

FIG. 5 illustrates a detailed view of the sealing function of valve seal of the present invention;

FIGS. 6 and 7 illustrate in side and front view respectively the typical stop mechanism in the present 90° valves; and FIGS. 8 and 9 represent respectively the functioning of the stop member in relation to the rotation of the valve shaft during use of the valve.

DETAILED DESCRIPTION OF THE PREFERRED EMBODIMENT

Figure 2:
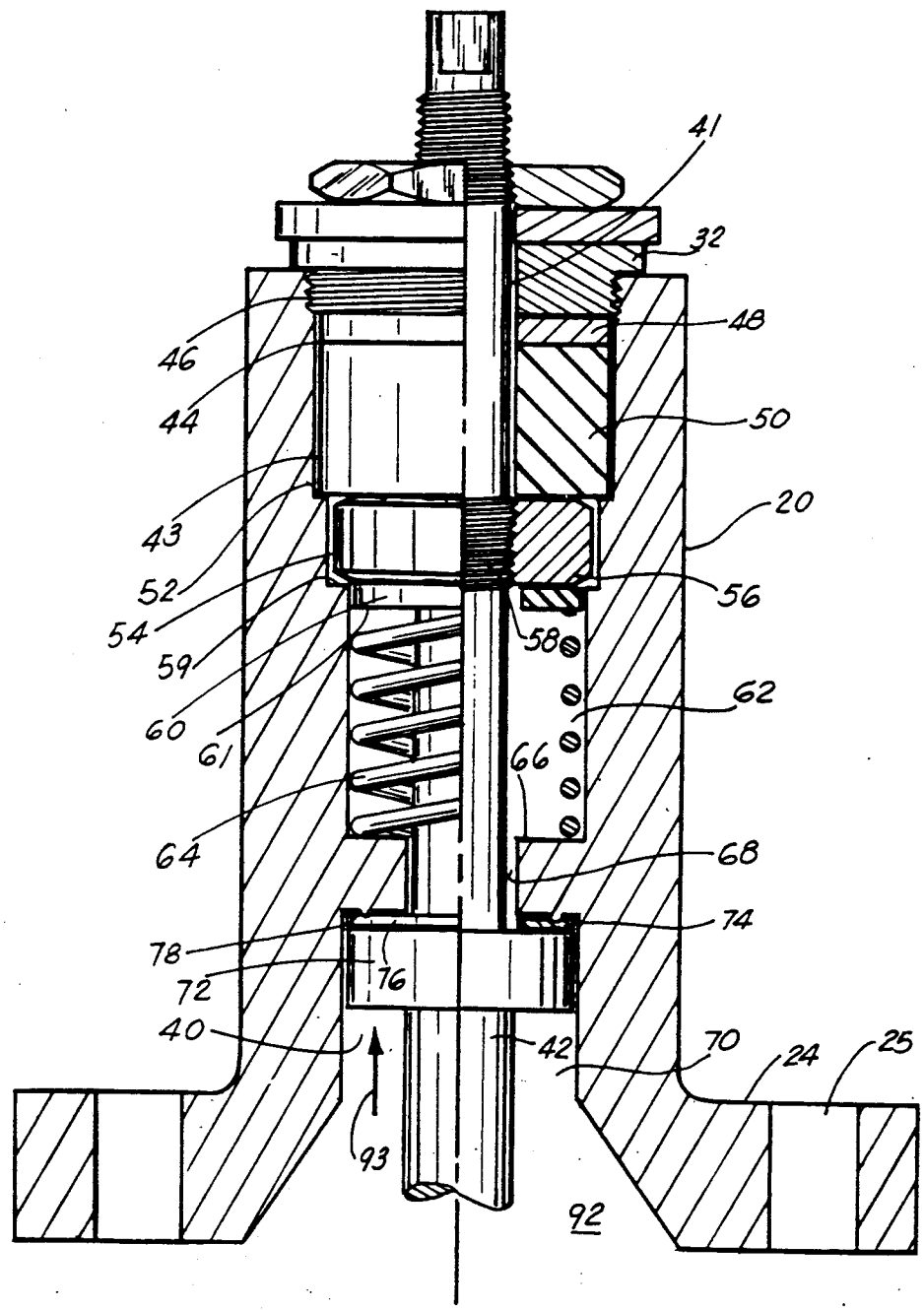
FIG. 2 illustrates a partial cross-sectional view of the preferred embodiment of the apparatus of the present invention illustrating the valve seal maintaining the spring and packing material outside of the process.

FIGS. 1 through 9 illustrate the preferred embodiment of the apparatus of the present invention utilized in the type of valve that is illustrated by the numeral 10. As illustrated, valve 10 is mounted upon a fluid flow line represented by fixture 12, the type of fixture having a first end flange 14 and second flange 16 which boltingly mount onto a flow line for allowing the passage of fluids or gases through the flow bore 18 as illustrated. Fixture 12 would have mounted upon it valve bonnet 10, valve bonnet 10 including a body 20, having a continuous annular side wall 22, with the base portion of body 20 including a circular flange portion 24 which would accommodate a plurality of bolts 26 for bolting onto the top surface 28 of fixture 12.

Of course, in operation, fixture 12 would have a bore in the top portion of fixture 12, for accommodating the valving element of valve 10 to operate within flow bore 18. In most cases, valve 20 is referred to as a "90° valve", with the valving element contained within flow bore 18 being either a ball valve element, plug valve element, or a butterfly-type valve. In any of these particular cases and perhaps others, the present invention would function, as will be illustrated further.

As further illustrated in FIG. 1, valve body 20 contains an upper face 30, wherein a top plug 32 would be threaded into the valve body 20, with a hex-nut 34 mounted thereupon. There is included an upper extending member 36, which represents the upper end of the valve shaft that will be discussed further.

Turning now to the internal structure of the valve, in utilizing the present invention, reference is made particularly to FIG. 2. As illustrated in FIG. 2, again there is illustrated in cross-sectional view valve body 20, having a continuous flange portion 24, which would include a plurality of bolt holes 25 for accommodating bolts 26, to be boltingly engaged upon the body member 12, as was illustrated further. Furthermore, valve body 20 would include a continuous bore 40 therethrough, with bore 40 including a valve shaft 42.

As illustrated, bore 40 includes an upper enlarged counterbore 44 with the upper end of counterbore 44 threaded at 46, for accommodating the threaded cap 32 that was referred to earlier.

Counterbore 42 would also house a metal washer 48 directly below cap 32, and a quantity of packing material 50 that is a flexible type of gasketing material, that would sealingly engage against the inner wall 43 of counterbore 44, and the annular wall 41 of valve shaft 42, which is extending through bore 40, as illustrated. Counterbore 44 would then provide a shoulder portion 52, upon which forms a reduced counterbore 54 with reduced counterbore 54 housing a compression nut, such as a spider nut 56, which is threaded along the threaded portion 58 of valve shaft 42, the function of which will be described further. Spider nut 56 housed within second counterbore 54 rests upon a shoulder 59, which then leads into a third enlarged counterbore 62, wherein a coil spring 64 is housed. The upper portion of spring 64 engages against the undersurface 61 of a metal washer 60, and the lower portion of spring 64 engages upon an annular shoulder member 66 formed by the valve body 20 to produce a reduced bore 68 upon which shaft 42 continues.

The bore 68 would then expand into a fourth enlarged counterbore 70, wherein an enlarged annular portion 72 of the valve shaft 42 is formed. Enlarged annular portion 72 has a flat polished upper face 73 which accommodates the underside of a flexible wafer member 76, which would preferably be constructed of polytetrafluoroethylene (PTFE or Teflon), which functions as the primary sealing means in the valve as illustrated (Teflon is a registered trademark of the DuPont Corporation).

Structurally it should be noted that the undersurface 78 of shoulder member 68 provides a continuous annular raised ring portion 80 (see FIG. 4 for details) which is formed in the lower surface 78 of shoulder 68 and provides a means for pressing into the flexible sealing member 76, and thereby, in addition to effectively forming a gasket seal along the upper surface 74 of wafer 76, transmits a downward directed force through the compression of wafer 76 along the annular raised portion 80, and creates a seal along the lower annular surface 75 of flexible wafer 76 between that portion of the flexible wafer 76 compressed via ring portion 80, and the polished upper face 73 of annular portion 72. The seal between the lower face of wafer 76 and the upper surface 73 of annular portion 72 is the type of seal which would allow rotation of the shaft 42 against the stationary lower face 75, of wafer 76 when operation of the valve is undertaken. As can be seen in FIGS. 2, 4, and 5, ring portion 80 is positioned intermediate the inner and outer edges of shoulder member 68 (that is, ring portion 80 is spaced from the inner and outer edges of shoulder member 68). As can also be seen in FIGS. 2, 4, and 5, ring portion 80 is positioned intermediate the inner and outer edges of flexible wafer 76 and intermediate the inner and outer edges of enlarged annular portion 72 (that is, ring portion 80 is spaced from the inner and outer edges of flexible wafer 76 and of enlarged annular portion 72).

It should be noted that spider nut 56 when tightly engaged forces the contraction of spring 64, which in turn would direct the upward force on wafer 76, thus effecting the gasket seal between the lower surface 78 of shoulder member 68 through raised ring portion 80. However, and more importantly, as was stated earlier, the compression of wafer 76 by the raised ring portion 80 introduces an annular ring of force between the lower surface 75 of wafer 76, and the flat polished upper face 73 of enlarged annular portion 72, a seal along that point to prevent fluid from flowing thereby.

As was discussed earlier, in FIGS. 4 and 5, it should be noted that FIG. 4 in fact illustrates a partial view of valve body 20, wherein annular shoulder 68 is protruding inwardly to a point adjacent valve shaft 42. As was stated earlier, there is formed an annular protrusion or raised area 80 formed within the lower surface 78 of annular shoulder 68, so that when the flexible wafer 76 as illustrated in phantom view, is contained within counterbore 70, the annular raised portion 80 would protrude and would bite into the surface of member 76 thus effecting the horizontal seal against flow of fluids between the inner wall 71 of counterbore 70, and the passage between the inner wall of shoulder portion 68 and the outer wall 43 of shaft member 42, thus preventing any fluid flow past that point.

Furthermore, as illustrated more clearly in FIG. 5, when wafer 76 is compressed by the intrusion of ring 80 into the upper surface of upper surface 74 of wafer 76, the compression of the wafer along phantom Arrow 77 imparts a downward directed force in that direction, thus creating a fluid tight seal at 79 between the upper polished face 73 of annular portion 72 and the lower face 75 of wafer 76. This sealing means directed in this annular fashion creates a horizontal seal for preventing fluid from flowing in the direction of Arrow 81 past point 79 as fluid may travel between wafer 76 and enlarged annular portion 72.

In this particular embodiment as illustrated in FIG. 2, is referred to as the embodiment which maintains the spring member 64 and the packing material 50 outside of the process, in view of the fact that the process fluid would be contained within area 92, which represents that area in which the lower portion of the valve shaft 42 has the actual valving member and which is protruding into the fluid passage that the valve is intended to restrict when necessary.

Therefore, any fluid which would be moving upward in space 92 in the direction of Arrow 93 would be precluded from traveling any further than wafer 76 and would therefore be prevented from moving into counterbore 62 and any other portions of the valve above the primary sealing element 76 as illustrated.

Figure 3:
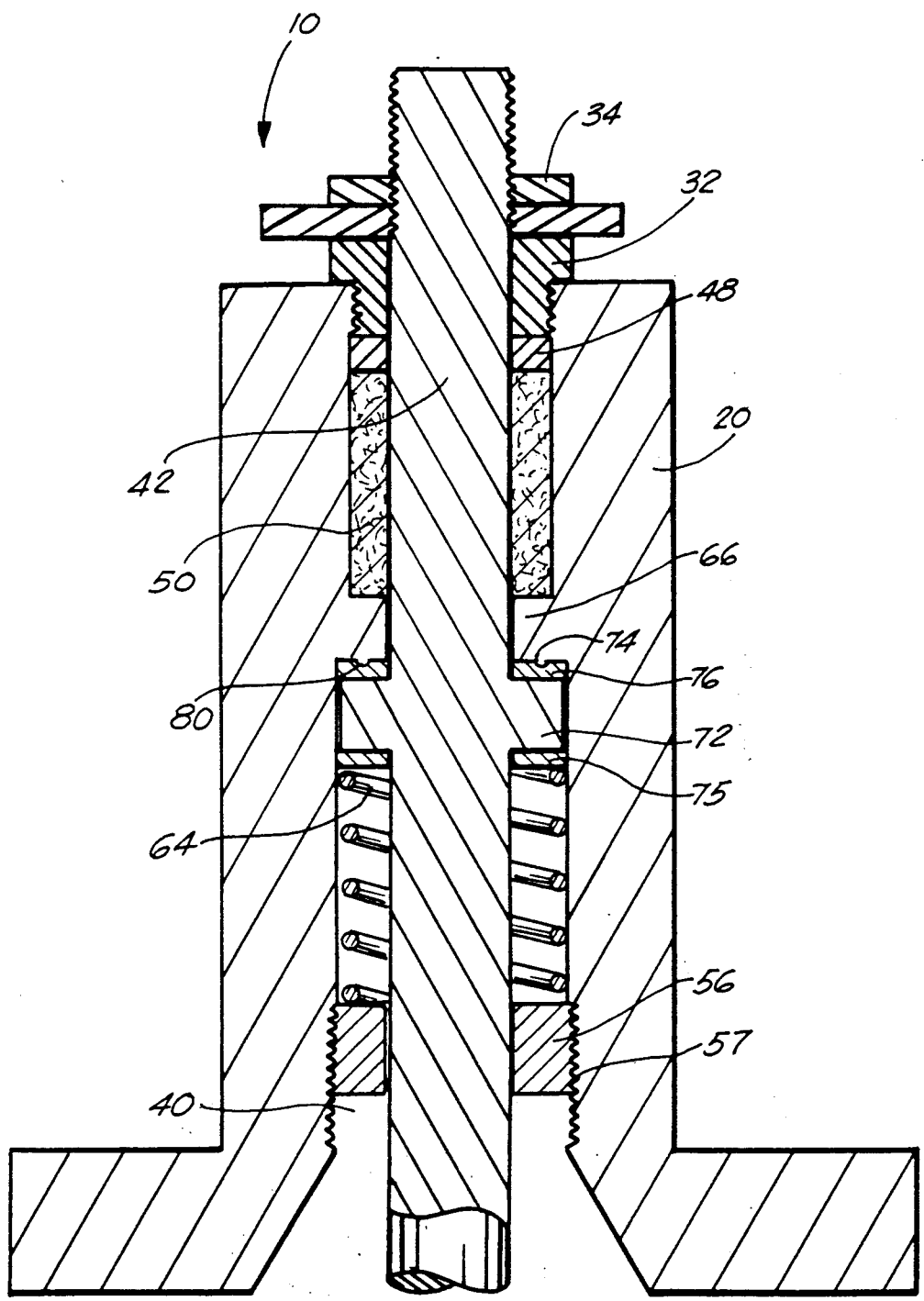
FIG. 3 illustrates a full cross-sectional view of the apparatus of the present invention wherein the valve seal is positioned with the spring inside of the process.

FIG. 3 likewise illustrates basically the same type of valve having a valve bonnet 20, the valve shaft 42 housed within the valve bore 40, and likewise having the hex-nut 34, the valve cap 32, with the valve cap 32 threadably engaged into bonnet 20 on the upper end of the bore 40, and pressing against a steel compression ring 48. Directly below packing material 50 there would be enlarged annular shoulder portion 66 of valve bonnet 20 protruding inwardly, as in the embodiment as illustrated in FIG. 2. Directly beneath annular portion 66 there would be located the flexible PTFE wafer 76, of the type that is illustrated in FIG. 2. Again, the undersurface of annular shoulder 66 would be provided with a raised ring portion 80, as in the embodiment as seen in FIG. 2, which would function in the same manner as earlier discussed. The wafer 76 would rest upon the upper polished surface 74 of shaft enlargement 72, again as seen in FIG. 2. Directly below the enlarged portion 72, spring 64 would be located pressing upwardly against the under side of enlarged portion 72. Directly beneath spring 64 there would be included the spider nut 56 threaded into the wall of body 20 via threads 57, so that as spider nut 56 is threaded thereupon tightly, it would force spring 64 to exert force upwardly against the washer 75 and enlarged portion 72, thus causing wafer 76 to be compressed between the annular shoulder 66 and the enlarged portion 72. The compression of wafer 76 via ring portion 80, would effectuate the same type of seal that was discussed previously in portion 72, and therefore need not be repeated.

This particular embodiment of the valve seal apparatus 10 provides that spring 64 is located "in the process". This simply means that with the process fluid contained in space 92, and perhaps traveling in the direction 93, the fluid may have the opportunity to travel in the space between the valve body and the valve stem and move into the enlarged counterbore 62 in which the spring 64 is placed, but would encounter again the sealing means 76 as it attempted to travel between the counterbore 62 and that area of the valve shaft along the sealing means 76.

In operation, it should be noted that wafer means 76, in carrying out its primary function, would be substantially stationary and would not move as the rotation of the valve stem occurs. Furthermore, in theory the sealing mechanism of the wafer accommodates a seal from the vertical to the horizontal. That is as noted in the packing material which attempts to seal between the inner wall 43 of counterbore 44 and the packing material, this particular primary sealing means i.e., wafer 76 provides that the seal be transferred to a horizontal seal along the surface between the sealing wafer and the upper structural component. That being the case, it provides a more effective seal, a seal which virtually eliminates any possibility of leakage that is not provided in the use of packing material only.

FIGS. 7 through 9 illustrate a feature of the valve for providing a means for ascertaining when the valve has been moved between open and closed positions. As noted, FIGS. 6 and 7 illustrate the stop member 100 which includes a substantially circular body portion 102 with a pair of flared stop portions 104 and 106 which are substantially 180° apart. Stop member 100 is provided with a substantially rectangular opening 108 which would slidably engage upon the substantially rectangular upper portion of the shaft 110, and would rest upon the cap member 32. As seen, cap member 32 would be provided with an upward protruding stem member 33, which would engage a face 105 of first stop 106, but yet would be free to travel within the space 109 between the second face 107 of stop member 104.

Therefore, as seen in FIG. 8, when the stop member 33 is abutting against the face 105 of stop 106, theoretically the valve would be totally open. Upon rotation of the valve stem in the direction of Arrow 112, the stop member would then be free to move within space 109 and would then engage the face 107 of stop 104 and therefore one would know that the valve is totally closed.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A valve sealing apparatus, comprising:
   a) a valving member;
   b) a valve bonnet having a continuous bore therethrough and in communication with the valving member;
   c) a valve shaft housed within the bore in the valve bonnet;
   d) primary sealing means, having inner and outer edges, positioned in the bore of the valve bonnet around the valve shaft;
   e) means positioned between the wall of the valve shaft and the wall of the bonnet for pressing into a face of the primary sealing means, thus imparting a downward force on the primary sealing means, to prevent horizontal fluid flow between the valve bonnet and the wall of the valve shaft, on both the upper and lower faces of the primary sealing means, wherein the means for pressing into the face of the primary sealing means comprises a shoulder portion formed in the wall of the valve bonnet having an annular raised ring portion in sealing relation against the face of the primary sealing means, the shoulder portion having inner and outer edges and the ring portion being spaced from the inner and outer edges of the primary sealing means, and wherein the lower surface of the primary sealing means contacts an upper polished surface of a shoulder portion formed by an enlarged area of the valve shaft, thus allowing rotation of the shaft while the primary sealing means remains stationary, the enlarged area of the valve shaft having inner and outer edges, the ring portion being spaced from the inner and outer edges of the enlarged area; and f) means associated with the valve bore for maintaining force on the primary sealing means in order to maintain a primary seal.

2. The valve in claim 1, further including a second sealing material in the valve bore.

3. The valve in claim 1, wherein the primary sealing means further comprises a wafer of polytetrafluoroethylene (PTFE).

4. The apparatus in claim 1, wherein the means for maintaining force on the face of the primary sealing means comprises a spring within the valve bore.

5. A valve sealing apparatus, comprising:
a) a valving member;
b) a valve bonnet have a continuous bore in communication with the valving member;
c) a valve shaft housed within the bore of the valve bonnet;
d) primary sealing means housed within the valve bore, and surrounding the valve shaft, the primary sealing means comprising a wafer, having inner and outer edges, of flexible material and resting on a polished surface of an enlarged area, having inner and outer edges, of the valve shaft;
e) means defined by an annular shoulder, having inner and outer edges, formed in the valve bonnet for contacting the upper face of the wafer, said means further comprising a raised ring portion for pressing into the upper face of the wafer and defining a force directed downward along the raised ring portion to effectively seal the lower face of the wafer and the upper polished surface of the enlarged area of the valve shaft along the annular force created by the raised ring portion biting into the wafer, the raised ring portion being positioned intermediate the inner and outer edges of the enlarged area of the valve shaft and intermediate the inner and outer edges of the wafer; and
f) means for exerting force in order to seal the upper and lower surfaces of the wafer between the valve bonnet and the enlarged portion of the valve shaft, for preventing fluid from traveling horizontally between the valve bonnet and the enlarged portion of the valve shaft.

6. In a valve of the type having a valving member, a valve bonnet, a bore through the length of the valve bonnet, a valve shaft housed within the valve bore of the bonnet, a spring positioned in the valve bore for exerting force between the valve bonnet and the valve shaft, a valve sealing means, the sealing means comprising:
a) a flexible wafer, having inner and outer edges, positioned around the valve shaft within the valve bore;
b) an annular shoulder portion, having inner and outer edges, formed by the valve shaft, and protruding into the valve bore, with one surface of the wafer resting thereupon;
c) an annular shoulder portion formed by the valve bonnet, the annular shoulder portion having an inner edge and an outer edge, and protruding into the valve bore, for contacting a second surface of the wafer; and
d) means on the annular shoulder portion of the valve bonnet contacting the second surface of the wafer, said means comprising a raised annular ring, spaced from the inner edge and the outer edge of the annular shoulder of the valve shaft and from the inner and outer edges of the wafer, that presses into the second surface of the wafer when sufficient force is placed upon the wafer, for sealing off both the upper and lower surfaces of the wafer between the shoulder portion of the valve bonnet and the annular shoulder portion formed by the valve shaft respectfully, substantially along the line of the raised annular ring, and preventing any horizontal fluid flow across the upper and lower surfaces of the wafer; and
e) means for exerting said sufficient force upon the wafer.

7. The valve in claim 6, further including a second sealing material in the valve bore.

8. The apparatus in claim 6, wherein the means for maintaining force on the face of the primary sealing means comprises a spring within the valve bore.

9. The valve in claim 6, wherein the primary sealing means comprises a wafer of polytetrafluoroethylene (PTFE).

10. A valve sealing apparatus, comprising:
a) a valving member;
b) a valve bonnet having a continuous bore therethrough and in communication with the valving member;
c) a valve shaft housed within the bore of the valve bonnet, the valve shaft comprising an annular shoulder portion, having inner and outer edges, extending into the bore of the valve bonnet;
d) a substantially flat sealing wafer, having inner and outer edges, resting on the shoulder portion formed in the valve shaft;
e) an annular shoulder portion, having inner and outer edges, formed in the wall of the valve bonnet and extending inwardly above the wafer resting on the shoulder portion of the valve shaft;
f) an annular raised protrusion, spaced from the inner and outer edges of the wafer, the inner and outer edges of the annular shoulder portion of the valve shaft, and the inner and outer edges of the annular shoulder portion of the valve bonnet, for pressing into a face of the sealing wafer to impart a force sufficient to prevent horizontal fluid flow between the shoulder portion of the valve bonnet and the shoulder portion of the valve shaft; and
g) means for imparting said force on the sealing wafer.

11. The apparatus of claim 10, wherein the annular raised protrusion is a ring.

12. The apparatus of claim 10, wherein the sealing wafer comprises polytetrafluoroethylene (PTFE).

13. The apparatus of claim 10, wherein the means for imparting said force comprises a spring within the valve bore.

* * * * *